(12) United States Patent
Bhatnagar et al.

(10) Patent No.: US 11,530,513 B2
(45) Date of Patent: Dec. 20, 2022

(54) BALLISTIC TRANSLATION EFFICIENCY OF HIGH PERFORMANCE FIBERS

(71) Applicant: HONEYWELL INTERNATIONAL INC., Morris Plains, NJ (US)

(72) Inventors: Ashok Bhatnagar, Richmond, VA (US); David A. Hurst, Richmond, VA (US); Charles Arnett, Richmond, VA (US); Gary Kratzer, Midlothian, VA (US); Henry Gerard Ardiff, Chesterfield, VA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 613 days.

(21) Appl. No.: 16/510,539

(22) Filed: Jul. 12, 2019

(65) Prior Publication Data
US 2020/0354886 A1    Nov. 12, 2020

Related U.S. Application Data

(60) Provisional application No. 62/701,259, filed on Jul. 20, 2018.

(51) Int. Cl.
*B29C 70/20* (2006.01)
*B29C 70/56* (2006.01)
(Continued)

(52) U.S. Cl.
CPC .......... *D06M 17/04* (2013.01); *B29C 70/202* (2013.01); *B29C 70/56* (2013.01); *B32B 5/12* (2013.01);
(Continued)

(58) Field of Classification Search
CPC ....... B29C 70/00; B29C 43/48; Y10T 442/20; Y10T 442/2615; Y10T 442/2623; F41H 5/00
See application file for complete search history.

(56) References Cited

U.S. PATENT DOCUMENTS

| 5,395,576 A | 3/1995 | Blauhut et al. |
| 5,460,764 A | 10/1995 | Held |

(Continued)

FOREIGN PATENT DOCUMENTS

| WO | WO-2008097355 A2 * | 8/2008 | ........... F41H 5/0485 |
| WO | 2011073331 | 6/2011 | |

(Continued)

OTHER PUBLICATIONS

Supplemental European Search Report for EP App. No. 19838414.
International Search Report for PCT/US2019/042533.

*Primary Examiner* — Jennifer A Steele
(74) *Attorney, Agent, or Firm* — Roberts & Roberts, LLP; Richard S. Roberts, Jr.

(57) ABSTRACT

A method for improving the translation efficiency of fiber strength into composite strength is provided. A single unidirectional tape, single unidirectional fiber web or a stack of unidirectional web/unidirectional tape plies formed from partially oriented fibers/tapes is primed under mild conditions followed by subjecting the primed plies to an axial extension stress in the axial fiber direction of each fiber ply by passage through a compression apparatus. The axial extension stress extends the fibers, strengthening them, while also compacting the plies together and thereby forming a composite having improved strength. Production yield is improved by avoiding maximal fiber stretching and thereby avoiding typical manufacturing loss, and low weight composite armor having increased strength is achieved.

20 Claims, 3 Drawing Sheets

(51) Int. Cl.
*B29K 223/00* (2006.01)
*D06M 17/04* (2006.01)
*B32B 5/12* (2006.01)
*B32B 5/26* (2006.01)
*B32B 7/12* (2006.01)
*D06C 3/00* (2006.01)
*D06M 15/233* (2006.01)
*D06M 15/705* (2006.01)
*D06M 15/71* (2006.01)
*D06M 101/20* (2006.01)

(52) U.S. Cl.
CPC ............... *B32B 5/26* (2013.01); *B32B 7/12* (2013.01); *D06C 3/00* (2013.01); *D06M 15/233* (2013.01); *D06M 15/705* (2013.01); *D06M 15/71* (2013.01); *B29C 70/20* (2013.01); *B29K 2223/0683* (2013.01); *B32B 2260/023* (2013.01); *B32B 2260/046* (2013.01); *B32B 2262/0253* (2013.01); *B32B 2571/02* (2013.01); *D06M 2101/20* (2013.01); *D10B 2321/0211* (2013.01)

(56) References Cited

U.S. PATENT DOCUMENTS

| | | | |
|---|---|---|---|
| 7,964,518 B1* | 6/2011 | Bhatnagar | B32B 27/04 |
| | | | 442/134 |
| 8,071,205 B2 | 12/2011 | Tsuchiya et al. | |
| 8,080,486 B1 | 12/2011 | Bhatnagar et al. | |
| 2003/0228815 A1* | 12/2003 | Bhatnagar | D03D 15/00 |
| | | | 442/164 |
| 2011/0095447 A1* | 4/2011 | Peters | B29C 55/06 |
| | | | 264/119 |
| 2012/0156952 A1 | 6/2012 | Ardiff et al. | |
| 2012/0312151 A1 | 12/2012 | Patel | |
| 2013/0115412 A1 | 5/2013 | Padmanabhan | |
| 2013/0147090 A1* | 6/2013 | Schromm | B29C 43/228 |
| | | | 425/363 |
| 2013/0202844 A1* | 8/2013 | Tam | D03D 1/00 |
| | | | 428/107 |
| 2016/0281272 A1* | 9/2016 | Ardiff | F41H 5/0485 |
| 2017/0348947 A1* | 12/2017 | Cordova | B32B 27/36 |
| 2018/0311916 A1* | 11/2018 | Wilkerson | B29C 70/526 |

FOREIGN PATENT DOCUMENTS

| | | | | |
|---|---|---|---|---|
| WO | WO-2011073331 A | * | 6/2011 | ............ B32B 27/12 |
| WO | WO-2011073331 A1 | * | 6/2011 | ............ B32B 27/12 |

* cited by examiner

BALLISTIC TRANSLATION EFFICIENCY OF HIGH PERFORMANCE FIBERS

CROSS-REFERENCE TO RELATED APPLICATION

This application claims the benefit of U.S. Provisional Application Ser. No. 62/701,259, filed on Jul. 20, 2018, the disclosure of which is incorporated by reference herein in its entirety.

BACKGROUND

Technical Field

This technology relates to improvements in ballistic resistant composite materials, and in particular to an efficient method for enhancing the tensile properties of fibrous composite materials.

Description of the Related Art

High performance thermoplastic fibers, such as polyolefin fibers, are widely used in the fabrication of composite structures. Various methods for fabricating high strength thermoplastic fibers are known and have been described, for example, in U.S. Pat. Nos. 4,413,110; 4,536,536; 4,551,296; 4,663,101; 5,032,338; 5,578,374; 5,736,244; 5,741,451; 5,958,582; 5,972,498; 6,448,359; 6,746,975; 6,969,553; 7,078,099; 7,344,668; 7,846,363; 8,361,366; 8,444,898; 8,747,715; and 9,365,953, the disclosures of which are incorporated by reference herein to the extent consistent herewith.

Each of these patents describe gel spinning techniques for the fabrication of high strength filaments where the filaments are drawn, i.e. stretched, across a series of draw rolls to improve their tensile strength properties. For example, U.S. Pat. Nos. 4,413,110, 4,663,101 and 5,736,244 describe the formation polyethylene gel precursors and the stretching of low porosity xerogels obtained therefrom to form high tenacity, high modulus fibers. U.S. Pat. Nos. 5,578,374 and 5,741,451 describe post-stretching a polyethylene fiber which has already been oriented by drawing at a particular temperature and draw rate. U.S. Pat. No. 6,746,975 describes high tenacity, high modulus multifilament yarns formed from polyethylene solutions via extrusion through a multi-orifice spinneret into a cross-flow gas stream to form a fluid product. The fluid product is gelled, stretched and formed into a xerogel. The xerogel is then subjected to a dual stage stretch to form the desired multifilament yarns. U.S. Pat. No. 7,078,099 describes drawn, gel-spun multifilament polyethylene yarns having increased perfection of molecular structure. The yarns are produced by an improved manufacturing process and are drawn under specialized conditions to achieve multifilament yarns having a high degree of molecular and crystalline order. U.S. Pat. No. 7,344,668 describes a process for drawing essentially diluent-free gel-spun polyethylene multifilament yarns in a forced convection air oven and the drawn yarns produced thereby. The process conditions of draw ratio, stretch rate, residence time, oven length and feed speed are selected in specific relation to one another so as to achieve enhanced efficiency and productivity. U.S. Pat. Nos. 7,846,363; 8,361,366; 8,444,898; 8,747,715; and 9,365,953 each teach improvements in the known methods of the art that improve fiber tensile properties and thus improve the ballistic resistance properties of armor composites formed therefrom.

A common processing step required by all of the above-referenced methods is fiber drawing, which is conventionally known to improve fiber strength and which is important in the fabrication of highly effective composite armor. However, in the course of drawing the filaments using any such drawing method, as a fiber approaches its stretching limit, filaments occasionally break. The broken filaments tend to become wrapped around one of the draw rolls, and as they wrap around the draw rolls they often interfere with adjacent unbroken filaments on the same draw roll causing those adjacent filaments to also break. Eventually, this may lead to breakage of the entire yarn. Once a yarn breaks, it can cause other yarns that are being concurrently drawn by the same drawing apparatus to break as well, leading to process failure and substantial product waste. In view of these problems, maximally drawing fibers to maximize their tenacity can be inefficient and produce relatively low product yields. Accordingly, it would be beneficial in the art if there were an alternate means for improving fiber tensile properties without the need to conduct significant fiber drawing after their initial fabrication to avoid such fiber breakage and waste.

Maximizing fiber tensile properties is important to the fabrication of effective composite armor, as is the strength of a matrix (binder) if present, particularly in the fabrication of effective armor from non-woven, unidirectional fibrous composites where a binder is used to hold the fibers of a unidirectional tape together. However, the strength of a composite does not strictly follow the Rule of Mixtures, i.e., the strength of a composite is not simply a direct measure of the strengths of the fiber and matrix components. Particularly, during the processing of the individual components into a fabric, some loss of strength of a composite is experienced relative to the strengths of the raw material components, referred to in the art as the translation efficiency. This may occur for a range of reasons, such as material degradation due to processing conditions or imperfect processing results during fiber-to-composite conversion (such as fiber misalignment, void formation or non-uniform application of coatings). This presents two significant problems. First, the degree of strength loss is unpredictable, making the strength of the composite unpredictable. Second, to compensate for such poor fiber-to-composite strength translation efficiency, more layers of material are needed to maintain the desired level of anti-ballistic performance when converting the composites to armor articles, which undesirably adds to the weight, bulkiness and cost of the armor. A solution is needed to address this problem.

It has been unexpectedly found that the present technology solves both of the manufacturing inefficiencies discussed above, namely, the problems of low fiber yield due to manufacturing product loss and low fiber-to-composite strength translation efficiency, by limiting the extent of fiber stretching and maximizing fiber strength through alternative processing.

SUMMARY OF THE DISCLOSURE

It has been particularly found that the translation efficiency of fiber and binder strengths into composite strength is improved by first priming (i.e. lightly pressing under mild conditions, such as by wet lamination) a single-ply unidirectional pre-preg web, a plurality of adjoined/stacked unidirectional pre-preg webs, a pre-preg unidirectional tape (single discrete pre-preg ply) or a plurality of adjoined/stacked pre-preg plies, followed by passing the primed web, discrete ply or plurality of plies/webs through an isobaric press (double belt press). When a plurality of plies and/or webs is primed, the priming step adheres the plies/webs together, typically forming a pre-preg combined web/fabric that comprises 2, 4, 6 or 8 plies (strata) (also referred to herein as a "multi-ply fabric" or a "multi-ply pre-preg fabric"), or more, or a combined web that comprises 2, 4, 6 or 8 total unidirectional webs (also referred to herein as a "multi-ply web" or a "multi-ply pre-preg web"), wherein each individual web is a single web stratum/web ply. A multi-ply pre-preg fabric or multi-ply pre-preg web may be processed through the isobaric press by itself or with one or more other multi-ply pre-preg fabrics, or a unidirectional pre-preg web, or with a single pre-preg unidirectional tape (single discrete ply) that have not been previously combined with or attached to another web/discrete ply.

In each embodiment, the pre-preg web(s)/unidirectional single discrete pre-preg ply/multi-ply pre-preg fabric comprises fibers that are coated with a polymeric binder, or alternatively comprises fibrous tapes (comprising fibers) or non-fibrous tapes (not comprising fibers) that are optionally coated with a polymeric binder. Coating with the binder is performed prior to subjecting the web(s)/discrete ply/fabric to axial extension in a compression apparatus, such as a compacting conveyor. By priming the web(s)/discrete ply/plies, the unidirectional alignment of the component fibers/tapes is made more uniform so that all the component fibers/tapes are straight and more uniformly aligned in the same axial direction, and the binder coating uniformity on the fibers or tapes (if present) is improved. In this regard, the fibers/tapes can move slightly when being coated with a resin. Priming the layer aids in straightening such fibers/tapes into a more ideal alignment. This maximizes fiber/tape coverage in the unidirectional fiber plies and also adjusts areas of excess binder concentration, which thereby maximizes projectile engagement with the fibers/tapes, but also straightens the fibers/tapes in preparation for axial extension. After priming, the primed unidirectional web(s)/discrete ply/multi-ply fabric is/are then subjected to axial extension stress(es) in the axial fiber direction of each web/discrete ply. By axially extending the fibers/tapes in the compression apparatus rather than completing stretching of the fibers by conventional drawing, the yield loss problems associated with maximally drawing the fibers are avoided. Additionally, the axial extension of the fibers/tapes in the compression apparatus under the conditions described herein avoids degradation of the fibers/tapes, achieving enhanced translation efficiency of the tensile properties of the fibers/tapes to the tensile properties of the end composite as compared with conventional fabrication methods such as consolidation under pressure of 5 psi or greater in, for example, a flat-bed laminator, autoclave or molding apparatus.

More particularly, provided is a fibrous article comprising one or more unidirectional fiber plies, each unidirectional fiber ply comprising a plurality of unidirectionally oriented fibers coated with a polymeric binder, wherein said fibrous article has been primed and wherein the fibers have been axially extended in a compression apparatus, wherein said fibers have an initial elongation-to-break value prior to being axially extended and a reduced elongation-to-break value after being axially extended, wherein the initial elongation-to-break value is greater than the reduced elongation-to-break value, and wherein the reduced elongation-to-break value is from about 2.0% to about 3.9%.

Also provided is a method for enhancing fiber tensile properties of a fibrous pre-preg composite, the method comprising:

a) providing at least one fibrous pre-preg composite comprising one or more unidirectional fiber plies, each of said plies comprising a plurality of unidirectionally oriented fibers coated with a polymeric binder, said fibers having a tenacity of 7 g/denier or more and a tensile modulus of 150 g/denier or more and elongation-to-break of at least 2.0%, wherein said fibers have a softening temperature and a melting temperature;
b) heating the fibers of said composite to a temperature above the softening temperature of the fibers but below the melting temperature of the fibers; and
c) subjecting the composite to an axial extension stress while said fibers are at said temperature above the softening temperature of the fibers but below the melting temperature of the fibers, whereby the fibers in each fiber ply are axially extended by said axial extension stress whereby the tenacity of each fiber in each ply is increased by at least 1% and the elongation-to-break of each fiber is reduced by at least 1%.

Also provided are composites and ballistic resistant articles formed according to said method.

DETAILED DESCRIPTION

A method is provided for fabricating high performance composite articles from one or more unidirectional fiber plies, wherein each individual "unidirectional fiber ply" may be in the form of a continuous web of unidirectionally oriented (aligned) fibers or in the form of a single discrete unidirectional ply/unidirectional tape having a definite length, as described below. Prior to pressing in a compression apparatus, the unidirectional fiber plies are also referred to herein as pre-pregs. The pre-pregs (a single unidirectional pre-preg web, a single, discrete, pre-preg unidirectional tape (single discrete ply), or multi-ply pre-preg (i.e., including a plurality of unidirectional webs and/or a plurality of unidirectional tapes) are initially formed from unidirectionally aligned fibers/tapes that have not been fully drawn, wherein the fibers/tapes have an elongation-to-break of at least 2.0%, typically at least 2.1%, or at least 2.2%, or at least 2.3%, or at least 2.4%. or at least 2.5%, or at least 2.6%, or at least 2.7%, or at least 2.8%. or at least 2.9%, or at least 3.0%, up to an elongation-to-break of about 4.0% or 5.0% or even greater. The fibers/tapes forming the pre-pregs are subsequently subjected to an axial stress that decreases the elongation-to-break, increases the tenacity of said fibers/tapes and thereby improves the properties of the composite formed from the fibers/tapes.

As used herein, the terms "orienting" and "drawing" refer to stretching of the fibers/yarns and the terms are used interchangeably. This is different than the term "oriented" as used in the context of "unidirectionally oriented fibers," which refers to the alignment direction of the fibers rather than to stretching of the fibers. As used herein, a "fiber" is a long strand of a material, such as a strand of a polymeric material, the length dimension of which is much greater than the transverse dimensions of width and thickness. The fiber is preferably a long, continuous (but of a definite length) strand, rather than a short segment of a strand referred to in the art as a "staple" or "staple fiber." A "strand" by its ordinary definition is a single, thin length of something, such as a thread or fiber. The cross-sections of fibers for use herein may vary widely, and they may be circular, oval, flat or oblong in cross-section. They also may be of irregular or regular multi-lobal cross-section having one or more regular or irregular lobes projecting from the linear (axial) axis of the filament. Thus the term "fiber" includes filaments, ribbons, strips and the like having regular or irregular cross-section. The term "composite" as used herein refers to combinations of a plurality of fibers and/or tapes, typically with a polymeric binder material.

A single fiber may be formed from just one filament or from multiple filaments. A fiber formed from just one filament is referred to herein as either a "single-filament" fiber or a "monofilament" fiber, and a fiber formed from a plurality of filaments is referred to herein as a "multifilament" fiber. Multifilament fibers as defined herein preferably include from 2 to about 3000 filaments, more preferably from 2 to 1000 filaments, still more preferably from 30 to 500 filaments, still more preferably from 40 to 500 filaments, still more preferably from about 40 filaments to about 240 filaments and most preferably from about 120 to about 240 filaments. Multifilament fibers are also often referred to in the art as fiber bundles or a bundle of filaments. As used herein, the term "yarn" is defined as a single strand consisting of multiple filaments and is used interchangeably with "multifilament fiber." As used herein, the term "tenacity" refers to the tensile stress expressed as force (grams) per unit linear density (denier) of an unstressed specimen and is measured by ASTM D2256. The "initial modulus" of a fiber is the property of a material representative of its resistance to deformation. The term "tensile modulus" refers to the ratio of the change in tenacity, expressed in grams-force per denier (g/d) to the change in strain, expressed as a fraction of the original fiber length (in/in). The term "denier" is a unit of linear density equal to the mass in grams per 9000 meters of fiber/yarn. In this regard, the fibers of this disclosure may be of any suitable denier. For example, fibers may have a denier of from about 50 to about 5000 denier, more preferably from about 200 to 5000 denier, still more preferably from about 650 to about 3000 denier, and most preferably from about 800 to about 1500 denier. The selection is governed by considerations of ballistic effectiveness and cost. Finer fibers are costlier to manufacture and to weave, but can produce greater ballistic effectiveness per unit weight. Like fibers, tapes may be of any suitable denier, preferably having a denier of from about 50 to about 30,000, more preferably from about 200 to 10,000, still more preferably from about 650 to about 2000, and most preferably from about 800 to about 1500.

Processes for the fabrication of ultra-high molecular weight polyethylene (UHMW PE) fibers are known from the prior art, such as in commonly-owned U.S. Pat. Nos. 7,846,363; 8,361,366; 8,444,898; 8,747,715 and 9,365,953, each of which is incorporated herein by reference to the extent consistent herewith. For example, in the processes of U.S. Pat. Nos. 8,747,715 and 9,365,953, a gel spun yarn is made from ultra-high molecular weight polyethylene by adding a slurry of UHMW PE and a spinning solvent into an extruder, forming a liquid mixture from said slurry in the extruder, followed by passing the liquid mixture through a heated vessel to form a homogeneous solution comprising the UHMW PE and the spinning solvent. That solution is then provided from the heated vessel to a spinneret to form a solution yarn, and the solution yarn that issues from the spinneret is then drawn at a draw ratio of from about 1.1:1 to about 30:1 to form a drawn solution yarn. That drawn solution yarn is then cooled to a temperature below the gel point of the UHMW PE polymer to form a gel yarn and the gel yarn is then drawn one or more times in one or more stages. The spinning solvent is then removed (by evaporation or extraction) from the gel yarn to form a dry yarn and the dry yarn is then drawn to form a partially oriented yarn and then further drawn in a post-drawing operation to form a highly oriented yarn. In the context of this disclosure, fibers useful herein that have been fabricated from this method are either partially oriented or highly oriented fibers. The elongation-to-break value of the fibers will vary depending on the extent of orientation, generally ranging from 2.9% to 3.9% for highly oriented fibers and being about 4.0% or greater for partially oriented fibers. For the purposes of this disclosure, there is no mandatory maximum or minimum elongation-to-break for the fibers (or tapes) forming the pre-preg web/single discrete ply (UDT)/multi-ply fabric, but in the fibers forming each pre-preg web/single discrete ply (UDT)/multi-ply fabric after axial extension in the compression apparatus have a preferred elongation-to-break of from about 2.0% to about 3.9%, and a single pass through the compression apparatus under the conditions described herein will reduce the elongation-to-break by at least about 1% to about 5%, or more.

In accordance with the method for enhancing composite tensile properties of this disclosure, a non-woven web of unidirectionally oriented fibers (or tapes) is formed by arranging continuous fibers/tapes side-by-side into a parallel array, most typically followed by coating the fibers/tapes with a polymeric binder material (also referred to herein as a "resin" or polymeric "matrix") and drying the binder material so that the fibers/tapes are adhered together. This web of continuous parallel, adhered fibers is referred to herein as a "pre-preg web." As used herein, an "array" describes an orderly arrangement of fibers or yarns, and a "parallel array" describes an orderly, side-by-side, coplanar parallel arrangement of fibers/tapes or yarns. The term "pre-preg" as used herein more specifically refers to combination of fibers or tapes that are connected to each other in the form of one or more fibrous plies or one or more fibrous webs, e.g., connected adhesively, but which have not yet been consolidated/compressed in the isobaric press. When the plies/webs comprise fibers the fibers are coated/impregnated with a polymeric binder (such as fabricated in FIG. 1), and when the plies/webs comprise tapes the polymeric binder is optional. Tapes that are not coated with a polymeric binder are fused together under high heat and optionally under pressure prior to being primed. Accordingly, the "pre-preg" is a pre-cursor that will be used as a component part of a later formed material/article and thus for the purposes of this disclosure, a "pre-preg web" refers to a continuous unidirectional web of binder/resin coated, non-woven, parallel fibers/tapes, as stated above. A "pre-preg unidirectional tape" is a discrete, single stratum/ply of non-woven parallel fibers that is cut from a pre-preg web (and thus has a definite length) prior to being subjected to the compression process in a compression apparatus (as process being described in greater detail below). Such a discrete, single unidirectional non-woven ply of parallel fibers/tapes having a definite length is also referred to in the art as a "unitape," "UD" or "UDT," which are terms that are synonymous with "unidirectional tape" and "unidirectional tape ply." In this regard, a "unidirectional tape" is different than a "tape" as described above, wherein a "tape" (fibrous or non-fibrous), is an elongate body like a fiber that may be grouped with other "tapes" in a parallel arrangement to form discrete ply of a "unidirectional tape," just as a plurality of fibers (or a combination of tapes and fibers) may be grouped in parallel arrangement to form a "unidirectional tape." As stated above, a "multi-ply fabric" or "multi-ply pre-preg fabric" is a combination of a plurality of discrete, non-woven, unidirectional tapes, each having a definite length (e.g., having been cut from a continuous pre-preg unidirectional fiber web) that have been adhered to each other such as by priming, such as by joining them together by wet lamination under low pressure. Typically, but not necessarily, such a multi-ply pre-preg fabric will have an even number of plies, e.g., 2 or 4 or 6 or 8, and each ply should be rotated so that the longitudinal/axial fiber direction of each ply is at an angle relative to the adjacent ply. In this regard, each discrete unidirectional tape ply will have both an outer top surface and an outer bottom surface. The plies are laid on each other so that the bottom surface of one is brought into contact with the top surface of the next discrete ply, with the plies being rotated so that the longitudinal/axial direction of the fibers in adjacent plies are not the same. Such rotated unidirectional alignments are conventionally known in the art of ballistic resistant composite armor and are described, for example, in U.S. Pat. Nos. 4,457,985; 4,748,064; 4,916,000; 4,403,012; 4,623,574; and 4,737,402, all of which are incorporated herein by reference to the extent not incompatible herewith. Most typically, the unidirectional plies are cross-plied orthogonally so that the fibers of all adjacent plies are oriented at 0° and 90° angles relative to each other, but adjacent plies can be aligned at virtually any angle between about 0° and about 90° with respect to the longitudinal/axial fiber direction of another ply. Methods of forming such multi-ply non-woven pre-preg fabrics are well known in the art and may be accomplished manually or may be automated with conventional stacking or cross-plying equipment, for example, using a cross-plying apparatus such as taught in U.S. Pat. No. 5,173,138, which is incorporated herein by reference to the extent consistent herewith, provided that the plies forming the multi-ply fabric are adjoined under low pressure per the priming conditions described herein because it is the priming step that forms the multi-ply structure.

When fabricating the pre-pregs, ideal fiber spreading will result in the individual fibers or even individual filaments being positioned next to one another in a single fiber plane, thereby forming a substantially unidirectional, parallel array of fibers with a minimal amount of fibers overlapping each other, if any. Typically, a pre-preg web or single pre-preg unidirectional tape will contain from about 3 to 55 fiber ends per inch of width (about 1.18 to about 21.65 ends per cm), more preferably from about 5 to about 45 ends per inch (about 1.97 to about 17.72 ends per cm), still more preferably from about 5 to about 20 ends per inch (about 1.97 to about 7.87 ends per cm), and most preferably from about 6 to about and 16 ends per inch (about 2.36 to about 6.30 ends per cm), with a typical fiber bundle (yarn) having from about 30 to about 2000 individual filaments depending on fiber type, with preferred polyethylene fiber bundles most typically having from about 120 to about 240 individual filaments.

Figure 1:
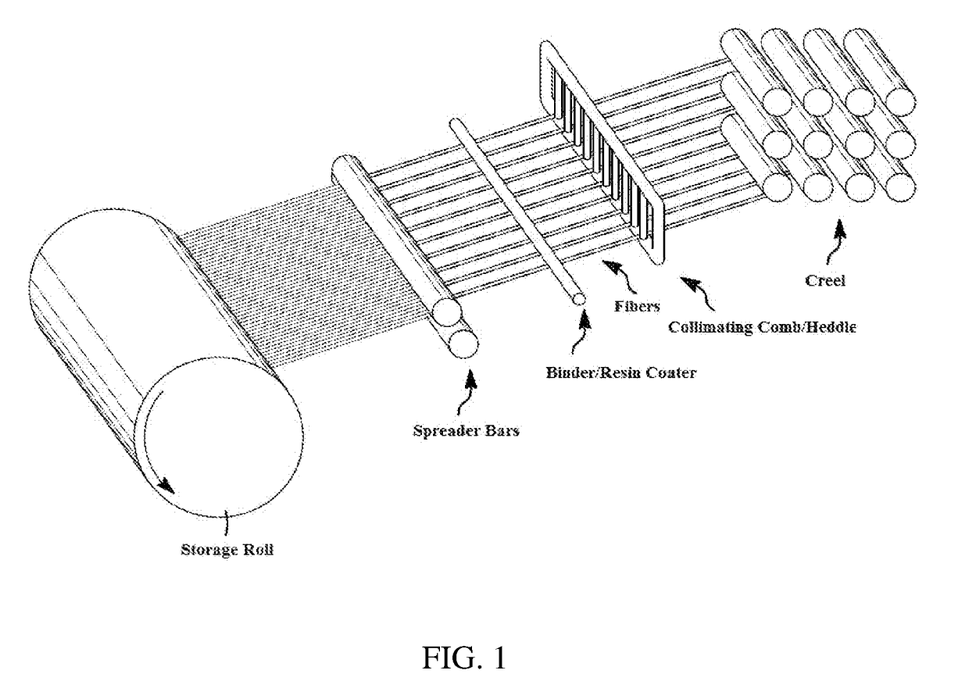
FIG. 1 is a top perspective view schematic representation of the formation of a unidirectional fiber ply.

As noted above, an exemplary pre-preg fabrication process as referenced above is illustrated in FIG. 1. As shown, multi-filament fiber bundles are supplied from a creel, led through a collimating comb/heddle to align the fibers in a proper parallel arrangement, coated with a binder material/resin and then pressed through a pair of spreader bars/rolls to spread out the filaments of the fiber bundles and spread out the binder. The binder is then dried or cured to complete the fabrication of the pre-preg, and the pre-preg is then rolled onto a storage roll for later use or may be cut into discrete layers of a definite length. This method is just illustrative and may be varied as desired. For example, the binder may in fact be applied at any point in the fabrication process, including any time before or after a plurality of fiber bundles are arranged into a parallel array. In such an alternative process, the fibers may instead be coated with the binder after passing through the spreader bars. In another alternate embodiment, illustrated in FIG. 2, an uncoated array of fibers (having been formed from fiber bundles supplied by a creel and aligned though a heddle/comb as described above), is coated with a polymeric binder such as in a conventional dip and squeeze coater, with excess binder being squeezed out and the fibers further spread by passage through additional rolls. Thereafter, the coated array is merged with a release film/paper (e.g., silicone release paper), optionally dried and sent for further processing, e.g., into unidirectional tapes of the desired lengths.

Following formation of the pre-preg web(s) and optional cutting of the web(s) into one or more discrete unidirectional pre-preg plies of desired lengths, the web(s) and/or one or more of the single unidirectional tape(s) is/are then primed. In the most preferred embodiments, a plurality of continuous fibrous webs or a plurality of single-ply unidirectional tapes are stacked together (loosely adjoined) and primed so that they are adhered to each other. In accordance with this disclosure, "priming" refers to lightly pressing the web or unidirectional tape ply/plies at a very low pressure, with or without heat, between two platens (e.g., through a conventional flat-bed laminator set at a very low pressure) or by passage through the nip of a pair of laminating rolls by techniques well known in the art. Such a priming step particularly includes wet lamination of plies together, which may optionally be performed in-line on a coater assembly (such as at the combining roller illustrated in FIG. 2), as well as a combination of wet lamination and passing through a flat-bed laminator/dual platens/nip of rolls. Such priming also includes pressing a single discrete ply or single unidirectional web, wherein such single discrete ply or web is not attached to another discrete ply or web. Regardless of the priming method, the pressure applied to the pre-preg web or discrete pre-preg unidirectional tape ply/plies during priming is preferably less than 5 psi (0.0345 MPa), preferably from about 0.01 psi (68.9 Pa) to 2.0 psi (0.0138 MPa), more preferably from 0.01 psi (68.9 Pa) to 1.0 psi (0.00689 MPa) and most preferably from 0.1 psi (689 Pa) to 0.5 psi (0.00345 MPa). When priming is conducted with heat, the heat is typically very low, i.e., at a temperature just above room temperature (20-22° C.) to about 50° C., preferably ranging from about 20° C. to about 50° C., more preferably from about 25° C. to about 50° C., and most preferably from about 25° C. to about 40° C., but may also be conducted at higher temperatures, e.g., from about 90° C. to about 100° C. The pre-preg web/unitape ply (or a combination of webs/unitape plies not yet adhered to each other that will become a multi-ply structure upon priming) will be subjected to the priming conditions for only a brief duration of from about 0.01 seconds to about 30 seconds, whereby the fibers are pressed into a more ideal alignment.

Priming may also be conducted using the same cross-plying apparatus used in the prior art to consolidate multiple plies, such as the apparatus of U.S. Pat. No. 5,173,138. The apparatus of U.S. Pat. No. 5,173,138 includes a means for laminating stacked plies, which may set to a low temperature and pressure and employed for priming the pre-pregs as provided by this disclosure. Priming may also be accomplished using any other conventional laminating apparatus wherein the web/UDT/stack of webs and/or UDT plies is treated according to the mild conditions described above.

Once primed, the web, single UDT ply or the adhered multiple webs and/or adhered multiple UDT plies (the multi-ply pre-preg web/fabric) is/are then heated and compressed in a suitable compression apparatus under substantial pressure that is significant enough to exert an axial extension stress on each of the fibers forming the web or each UDT ply, whereby each of the fibers/tapes forming the web or each UDT ply is axially extended, i.e., axially stretched by being subjected to axial compressive stress in the axial fiber direction. If the pre-preg is a multi-ply pre-preg fabric or multi-ply web, the multi-ply pre-preg fabric/web is multi-axially extended because the fibers/tapes in each web/UDT ply will be axially extended in each respective axial direction of the cross-plied fibers/tapes forming the individual component webs/UDT plies (e.g., a 2-ply fabric will be bi-axially extended). Depending on the pressure, said axial extension stress is sufficient to effectively increase the tenacity of the component fibers by about 1% or more, preferably from about 1% to about 5%, whereby the elongation-to-break of each fiber is also reduced by at least about 1%, or from about 1% to about 5%, with greater pressure yielding greater axial extension.

The temperature to which the single pre-preg UDT ply, multi-ply fabric, and/or web(s) are heated will necessarily vary depending on fiber type and the polymeric binder type (if present) forming the pre-pregs. In this regard, suitable fibers are synthetic thermoplastic fibers having an axial (linear) thermal conductivity of at least 0.1 W/(m·K) to about 300 W/(m·K) when measured at 23° C. (room temperature), more preferably from about 0.1 W/(m·K) to about 125 W/(m·K), still more preferably from about 0.1 W/(m·K) to about 105 W/(m·K), still more preferably from about 50 W/(m·K) to about 105 W/(m·K), and most preferably from about 80 W/(m·K) to about 105 W/(m·K), as measured by conventionally known methods, such as the guarded hot plate method according to ASTM C-177 (for measuring up to 100 W/(m·K)) or the guarded hot flux sensor method according to ASTM C518 (for measuring values over 100 W/(m·K)). These polymer types have both a softening temperature (Vicat Softening Temperature as determined by ASTM D1525/ISO306) and a melting temperature. Suitable synthetic, thermoplastic polymers non-exclusively include polyolefin fibers, such as extended chain polyethylene and extended chain polypropylene fibers, polyester fibers including polyethylene terephthalate fibers, nylon fibers, polyvinyl acetate fibers and polyacrylonitrile fibers. The melting point of all thermoplastic fiber types other than UHMW PE may be determined by ASTM D7138. UHMW PE has such a high molecular weight that a different method, ASTM F2625, is followed to determine its melting point. For example, UHMW PE fibers having a c-axis orientation function at least 0.96 and an intrinsic viscosity of from about 7 dl/g to 40 dl/g when measured in decalin at 135° C. by ASTM D1601-99, has a Vicat softening temperatures of 80° C. and a melting temperature as determined by ASTM F2625 of approximately 136° C. Therefore, UHMW PE fibers are heated to a temperature of from about 80° C. to about 136° C. after priming and in preparation for compression, preferably being heated to a temperature of from about 90° C. to about 136° C., or from about 115° C. to about 136° C. Polyethylene fibers having lower molecular weights will have lower softening and melting temperatures that could be readily determined by one skilled in the art. Fiber types having an axial (linear) thermal conductivity of less than 0.1 W/(m·K), such as aramid fibers, graphite (carbon) fibers, glass fibers, quartz fibers, basalt fibers, will not exhibit an enhancement in tenacity, but may nonetheless benefit from similar processing. For example, a composite type comprising any fiber and binder type that has been primed will benefit from the enhanced degree of compaction and reduction of air voids in the composite resulting from passing the composite through the compacting conveyor.

Methods for heating the single UDT, multi-ply pre-preg fabric(s)/web(s) are conventional in the art and include passing the pre-preg web or cut unidirectional plies through one or more ovens, preferably forced air convection ovens such as those described in U.S. Pat. No. 7,344,668, with oven residence time being selected within the skill of a person with ordinary skill in the art, as well as heating the same with heated platens. Alternately, the pre-pregs may be heated by the compression apparatus rather than prior to entry if the compression apparatus has a heating capability, which is most preferred.

Once heated to the proper temperature (provided that it is pre-heated), the primed pre-preg web(s)/discrete ply/multi-ply fabric (each of which is also referred to herein as a "material" or "primed material" that is passed through the compression apparatus) is/are compressed in a compression apparatus capable of applying significant, uniform pressure to the pre-preg material, preferably while also conveying the composite through the compression apparatus. Additionally, if thicker materials are desired depending on the desired end use application, a plurality of said lightly adhered, primed stacks of unidirectional tapes may be combined coextensively and compressed together in the same compression apparatus. It is particularly intended that the compression apparatus is a compacting conveyor, most particularly a double belt press or a steel belt press. Most preferably the double belt press is an isobaric double belt press, or an isobaric steel belt press when the belts comprise steel. A double belt press is a type of compacting conveyor that comprises two pressure exerting elements, typically steel belts as just noted. The materials are compressed between the pressure exerting elements whereby said pressure exerting elements concurrently subject the composite to an axial extension stress while the composite is simultaneously conveyed through said compression apparatus.

Suitable double belt presses are commercially available, for example, from Hymmen International, Inc. of Grand Rapids, Mich.; Dieffenbacher GmbH & Co. of Eppingen, Germany; Held Technologie GmbH of Trossingen, Germany; Sandvik Process Systems LLC of Totowa, N.J.; and Siempelkamp LP of Marietta, Ga., among others.

Figure 3:
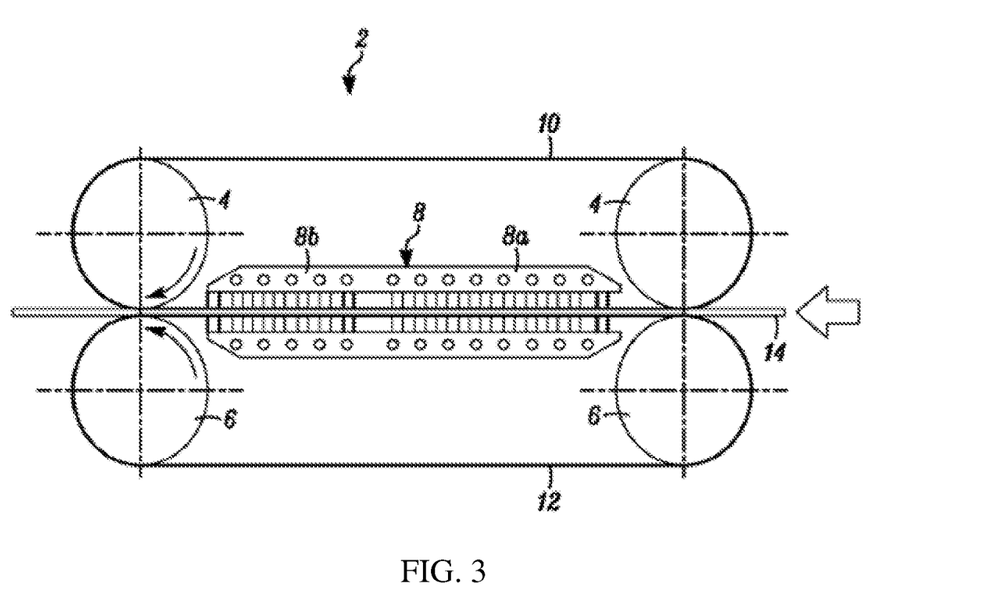
FIG. 3 is a schematic cross-sectional view of an isobaric belt press and a composite material being formed therein.

An exemplary isobaric double belt press 2 is illustrated in FIG. 3. With reference to FIG. 3, such a suitable double belt press 2 is illustrated which includes a first belt 10, a second belt 12, a first plurality of rollers 4 supporting first belt 10, a second plurality of rollers 6 supporting second belt 12, and a temperature unit 8. As illustrated, the first plurality of rollers 4 rotates in a clockwise direction and is positioned above the second plurality of rollers 6. Conversely, the second plurality of rollers 6 rotates in a counter-clockwise direction, which in combination with the clockwise rotation of the first plurality of rollers 4, advances the primed material 14 through the press 2.

As the primed material 14 enters isobaric press 2, first and second belts 10, 12 are configured to apply a continuous pressure of from about 45 bar (about 600 psi) to about 80 bar (1100 psi) to the primed material 14 as it advances through the isobaric press 2. The continuous high pressure is applied uniformly to the primed material 14 and causes the fibers to experience an axial extension stress that axially extends or stretches each of the fibers their respective axial fiber directions (i.e., the lengthwise directions that the fibers/tapes are oriented/extended in each component unidirectional web/UDT ply). This biaxial extension results in an increase in properties of the material as a whole in both directions. As stated above, if the primed material as pressed is only a single discrete UDT ply or unidirectional web, the stress extension stress is uniaxial. If the material being primed is an adhered combination of multiple cross-plied UDT plies or a cross-plied multi-web pre-preg, the extension stress is bi-axial or multi-axial, with axial stresses being exerted in the axial fiber directions of each web/UDT ply individually. The residence time of the primed material within the press is continued for a time sufficient for the tenacity of each fiber to be increased by at least about 1%, preferably 1% to about 5%, and the elongation-to-break of each fiber is to be reduced by at least 1%, preferably 1% to about 5%, which is achieved under the pressing conditions described herein.

In addition to being pressed by first and second belts 10, 12, the material 14 passes through temperature unit 8 which includes a heating portion 8*a* and a cooling portion 8*b*. As such, material 14 receives continuous high pressure from first and second belts 10, 12 while being both heated (first) and then cooled (second). Due to this active cooling of the fibers while the material is under pressure within the press, rather than allowing the fibers to cool naturally to room temperature upon exiting the press, the extended fiber structure is maintained, i.e., locked in, whereas if the fabrics are naturally cooled the warm fibers exhibit some degree of shrinkage, reversing some of the fiber extension and thereby at least partly reversing the improvement to the fiber properties. Significantly, the pressure exerted by the press on the material constrains the fibers, thereby preventing fiber shrinkage that would normally occur, which is accompanied by a reversion of the fiber molecular structure from a more ordered to a less ordered state, which reduces the tensile properties of the fibers/fibrous material.

This combination of the intense pressure with both heating and cooling additionally results in a high degree of compaction and a reduction of air voids in the compressed material and the removal of other interstices within the material, thereby providing a smooth and substantially uniform surface that is more resistant to corrosive and degrading conditions, including resistance to environmental conditions such as gasoline, salt water, humidity, etc., which are thought to degrade the material properties of such fibrous composites, in comparison to pressed materials that are just allowed to cool naturally to room temperature rather than being actively cooled in the cooling zone.

In a preferred embodiment, the material being passed through the press is maintained under continuous and constant axial tension by a tension device, which may be a storage roll (not illustrated) that the pressed material is rolled onto, which storage roll is actively turned to apply a tension to the material as it passes through the press. In this embodiment, the primed material is typically a single web or multi-ply web. A back tension may also be applied by providing a roll of the material to the press from a delivery roll (i.e., roll storing rolled up, primed material to be supplied to the press; not illustrated) that is actively rolled (to thereby unroll the primed material for passage through the press) at a rate lower than a storage roll, or by limiting the roll speed of said delivery roll to a rate lower than the rate at which the material is passed through the press, with or without the presence of a storage roll, such as by equipping the delivery roll with a brake or another type of tensioner, such as a disk type tensioner, a pin type tensioner, a dancer arm tensioner, and the like as would be determined by one skilled in the art. In this embodiment as well, the primed material is typically a single web or multi-ply web. Typically, it is desired for the overall axial tension on each fiber to be in the range of about 100 to about 1000 grams-force, more preferably in the range of about 200 to about 800 grams-force as the material is passed through the press, wherein the tension is preferably continuous and constant, particularly when the material being passed through the compacting conveyor is in the form of a continuous web of material, whether this web being compacted includes one unidirectional array of continuous fibers or is a continuous multi-ply web formed from multiple primed fiber plies.

In another embodiment, when the material being passed through the press includes more than one discrete fiber ply, such as one or more 2-ply pre-preg fabrics, concurrent axial and transverse axial tension may be exerted on the material by mounting the material in axial or bi-axial stretching frames such as disclosed in U.S. Pat. No. 3,153,812, which is incorporated by reference herein to the extent consistent herewith.

With regard to the residence time in the press, for a typical isobaric belt press having a 1.5-meter heating zone that is directly followed by an abutting 1.0-meter cooling zone, the material will travel through the press at a rate of from about 2 meters/min to about 10 meters/minute, most preferably at a rate of about 4 meters/min to about 8 meters/minute. In an exemplary process where the material is passed through the press at about 6 meters/min, the residence time in the heating zone will be approximately 15 seconds and the residence time in the cooling zone will be approximately 10 seconds. When the material is passed through the press at these rates and with an applied pressure of from about 45 bar (about 600 psi) to about 80 bar (1100 psi), and the other processing conditions described herein including subsequent cooling to room temperature under a continuous, maintained, constant pressure as described herein, the tenacity of each fiber is increased by at least about 1% and the elongation-to-break of each fiber is to be reduced by at least 1% herein. In addition, the primed and compressed materials will exhibit a higher shear strength property and a lower coefficient of friction relative to comparative materials that were not processed through the isobaric, double belt press.

In the most preferred embodiments, the primed material is passed through the press at a rate sufficient to subject the primed material to an axial extension stress having a magnitude of at least about 1 pound per lineal inch (PLI) of material width to about 30-PLI at a temperature of about 90° C. to about 125° C., which is expected to yield an increase in tensile properties of at least 5%, at least for fibrous webs comprising ultra-high molecular weight polyethylene fibers.

Figure 4:
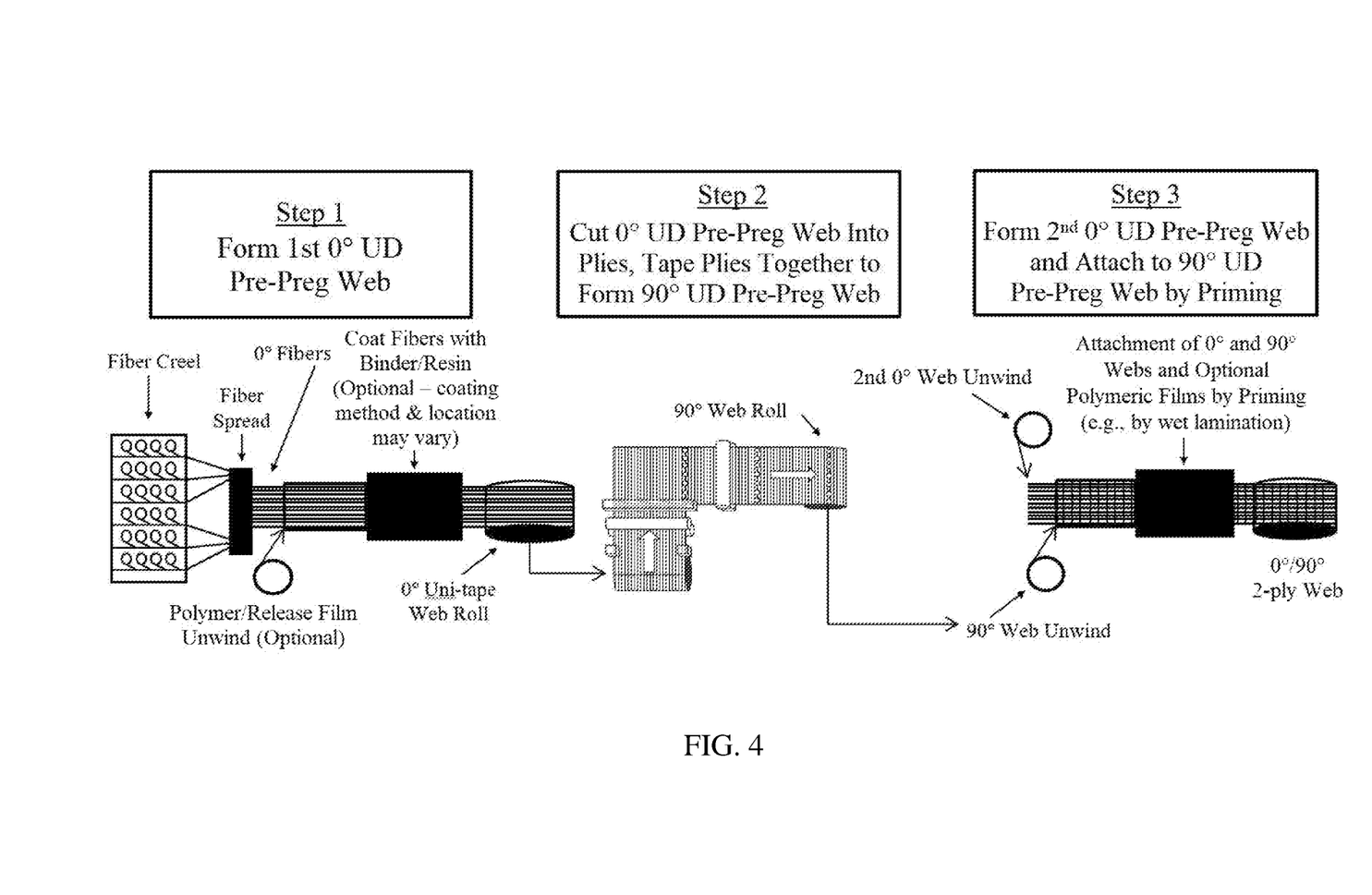
FIG. 4 is a schematic perspective view of the fabrication of a 2-ply 0°/90° web.

When the primed material as conveyed through the press is in the form of a continuous single ply or multi-ply web, it is preferred that the web be provided in roll form, such as from a first storage roll as illustrated in FIG. 1 and FIG. 4, with the web being similarly rolled onto a second storage roll after exiting the press. While being conveyed through the press from such a first storage roll to such a second storage roll, the storage rolls may be actively rotated so as to apply tension to the web as it is conveyed through the press. Mechanisms and methods for rotating such storage rolls are known in the art and would be readily arranged by one skilled in the art. If such tension is applied to the web, the tension will preferably range from about 2 Newtons/cm to about 50 Newtons/cm or from about 5 Newtons/cm to about 50 Newtons/cm, with a tension of of from 2 N/cm to about 25 N/cm being more preferred and 2 N/cm to about 13 N/cm being most preferred.

When one or more multi-ply fabrics (e.g., a plurality of 2-ply fabrics) or one or more multi-ply webs (e.g., a plurality of 2-ply webs) are passed through the press, the significant pressure of the press causes the fabrics/webs to be fully consolidated together into a composite material that is a single, unitary layer or single, unitary web where the component layers/webs are no longer separable from each other (without destruction of at least the material that is being removed). They are transformed into a single, consolidated, unitary multi-ply construction. The total number of unidirectional tapes or webs incorporated will again depend on the end use of the composite and would be readily determined by one skilled in the art. For example, in an armor application, a composite armor article may include from 2 to about 100 2-ply UDTs, more preferably rom from about 2 to about 85 and most preferably from about 2 to about 65. In the context of this disclosure, these multi-ply materials are preferably formed by cutting a plurality of discrete lengths from a multi-ply web that has been compressed in a compression apparatus of this disclosure, followed by another consolidation step, such as stitching or conventional fibrous composite molding techniques. The greater the number of total plies translates to greater ballistic resistance, but also greater weight. Minimum levels of body armor ballistic resistance for military use are categorized by National Institute of Justice (NIT) Threat Levels, as is well known in the art. For example, if a 2-ply fabric (also referred to herein as a "fiber layer") has an areal density of from about 60 g/m$^2$ to about 130 g/m$^2$, to produce an armor article having an areal density of 1.0 lb/ft$^2$ (psf) (4.88 kg/m$^2$ (ksm)) a total number of from about 38 to about 81 of 2-ply fabrics must be combined in the press.

The areal densities of the single web ply or single UDT ply or multi-UDT/multi-web material that is passed through the isobaric press is not intended to be strictly limiting, but each single unidirectional web ply or single unidirectional tape ply will generally have an areal density ranging from about 10 g/m$^2$ to about 95 g/m$^2$, or from about 15 g/m$^2$ to about 95 g/m$^2$ or from about 30 g/m$^2$ to about 95 g/m$^2$, and it is preferred that a multi-unitape or multi-web stack passed through the press includes from 2 to 8 total plies (webs and/or unitapes), each ply comprising fibers coated with a polymeric binder/matrix that is preferably a highly flexible, low modulus polymer, such as an elastomeric and/or thermoplastic polymeric binder having an initial tensile modulus of less than 6,000 psi, more preferably 4,000 psi or less, and most preferably 2,000 psi or less.

As noted above, the fiber types preferred herein are synthetic thermoplastic fibers that are thermally conductive, having a thermal conductivity of at least 0.1 W/(m·K). Such fibers typically also exhibit both a softening temperature (Vicat Softening Temperature as determined by ASTM D1525/ISO306) and a melting temperature. This includes fiber types such as polyolefin fibers, such as extended chain polyethylene and extended chain polypropylene fibers, polyester fibers including polyethylene terephthalate fibers, nylon fibers, polyvinyl acetate fibers and polyacrylonitrile fibers. Also acceptable are melt spun polyethylene fibers, such as those taught in U.S. Pat. No. 7,935,283, which is incorporated by reference herein to the extent consistent herewith. Also useful are polyethylene tapes as described in, for example, commonly-owned U.S. Pat. Nos. 8,263,119; 8,697,220; 8,685,519; 8,852,714; 8,906,485; 9,138,961 and 9,291,440, each of which is incorporated herein by reference to the extent consistent herewith. In this regard, the term "tape" refers to a flat, narrow, monolithic strip of material having a length greater than its width and an average cross-sectional aspect ratio, i.e. the ratio of the greatest to the smallest dimension of cross-sections averaged over the length of the tape article, of at least about 3:1. A tape may be a fibrous material or a non-fibrous material, wherein a fibrous material comprises one or more filaments, such as those described in the above-referenced patents. A non-fibrous tape material may be formed, for example, from strips of polymer formed by slicing a polymer film. A tape is distinguished from a fiber having a flat or rectangular cross-section in that the fiber has an aspect ratio of less than 3:1, typically having an aspect ratio of from 1:1 to 2:1.

Fiber types such as aramid fibers, M5® fibers, graphite (carbon) fibers, glass fibers, quartz fibers, basalt fibers, etc., which are not melt processable and exhibit very low thermal conductivity (<0.1 W/(m·K)) when measured at 23° C. (room temperature) may similarly benefit from similar processing but will not exhibit an enhancement in tenacity like the other fiber/tape types, i.e., they experience little or no elongation when passed through the press and accordingly do not achieve a tenacity increase of at least 5% and an elongation-to-break reduction at least 5%, but may benefit from enhanced compaction as discussed above.

In the case of polyethylene, preferred fibers are extended chain polyethylenes having weight average molecular weights of at least 300,000, preferably at least 5000,000, more preferably at least one million and even more preferably between two million and five million, with those having weight average molecular weights of at least 1,000,000 generally being referred to as ultra-high molecular weight polyethylene. Such extended chain polyethylene (ECPE) fibers may be grown in solution spinning processes such as described in U.S. Pat. No. 4,137,394 or 4,356,138, which are incorporated herein by reference, or may be spun from a solution to form a gel structure, such as described in U.S. Pat. Nos. 4,413,110; 4,536,536; 4,551,296; 4,663,101; 5,006,390; 5,032,338; 5,578,374; 5,736,244; 5,741,451; 5,958,582; 5,972,498; 6,448,359; 6,746,975; 6,969,553; 7,078,099; 7,344,668; 7,846,363; 8,361,366; 8,444,898; 8,747,715 and 9,365,953, all of which are incorporated herein by reference. Particularly preferred fiber types are any of the polyethylene fibers sold under the trademark SPECTRA® from Honeywell International Inc. SPECTRA® fibers are well known in the art. Other useful polyethylene fiber types also include and DYNEEMA® UHMW PE yarns commercially available from Royal DSM N.V. Corporation of Heerlen, The Netherlands. The UHMW PE fabrication methods of U.S. Pat. Nos. 8,747,715 and 9,365,953, which were described in greater detail above, are merely exemplary.

Particularly preferred methods for forming UHMW PE fibers are processes that are capable of producing UHMW PE fibers having tenacities of at least 35 g/denier, most preferably where the fibers are multi-filament fibers. The most preferred processes include those described in commonly-owned U.S. Pat. Nos. 7,846,363; 8,361,366; 8,444, 898; 8,747,715; and 9,365,953, the disclosures of which are incorporated by reference herein to the extent consistent herewith. These processes are capable of fabricating very high tenacity UHMW PE fibers. Such processes are called "gel spinning" processes, also referred to as "solution spinning," wherein a solution of ultra-high molecular weight polyethylene and a solvent is formed, followed by extruding the solution through a multi-orifice spinneret to form solution filaments, cooling the solution filaments into gel filaments, and extracting the solvent to form dry filaments. These dry filaments are grouped into bundles which are referred to in the art as either fibers or yarns. The fibers/yarns may then be stretched (drawn) up to a maximum drawing capacity to increase their tenacity. As the fibers are drawn, the elongation-to-break percentage decreases, meaning that as they are drawn the extent to which they may be drawn further is inherently reduced.

Methods for forming the other suitable fiber types as well as suitable polyethylene tapes are well known in the art. Drawing of all fibers/tapes useful herein should be limited to the point at which their elongation-to-break is still at least 2.0%, but drawing should be sufficient to achieve fibers having a minimum tenacity of at least 7 g/denier, a preferred tensile modulus of at least about 150 g/denier, and preferably an energy-to-break of at least about 8 J/g, each as measured by ASTM D2256. However, the composite materials of this disclosure are intended for high performance applications, such as anti-ballistic materials or impact resistant textiles, and therefore fibers forming each unidirectional fibrous ply (web and UDT) should be substantially greater than 7 g/denier. In this regard, it is preferred that each of the fibers forming the fibrous plies, prior to being subjected to the axial extension stress (e.g., in the double belt press), have a tenacity of greater than 25 g/denier, more preferably a tenacity of from about 28 g/denier to about 50 g/denier, still more preferably from about 33 g/denier to about 50 g/denier, still more preferably 39 g/denier or more, still more preferably from at least 39 g/denier to about 50 g/denier, still more preferably 40 g/denier or more, still more preferably 43 g/denier or more, or at least 43.5 g/denier, still more preferably from about 45 g/denier to about 50 g/denier, still more preferably at least 45 g/denier. Following being subjected to the axial extension stress (e.g., in the double belt press), the fibers will have an increased tenacity of at least 1%, preferably at least 2%, more preferably at least 5%, still more preferably 10% or greater, and most preferably at least 15% greater than the original fiber tenacity before being subjected to the axial extension stress. These axially extended fibers of the final, compressed composite preferably have a tenacity of greater than 27 g/denier, more preferably from about 28 g/denier to about 60 g/denier, still more preferably from about 33 g/denier to about 60 g/denier, still more preferably 39 g/denier or more, still more preferably from at least 39 g/denier to about 60 g/denier, still more preferably 40 g/denier or more, still more preferably 43 g/denier or more, or at least 43.5 g/denier, still more preferably from about 45 g/denier to about 60 g/denier, still more preferably at least 45 g/denier, at least about 48 g/denier, at least about 50 g/denier, at least about 55 g/denier or at least about 60 g/denier, with similar tenacity ranges for fibrous tapes. Although fibers having these tenacity ranges may be achieved by conventional drawing without subjecting the fibers to axial extension in a compression apparatus, greater results are achieved when the peak tenacities of the fibers/tapes are achieved by a combination of drawing and compression extension (i.e., axial extension in the compression apparatus) rather than drawing alone for the reasons discussed above.

The fibers of this disclosure will have a greater denier prior to compressive axial extension as compared to after compressive axial extension. In this regard, the pre-compression extended fibers preferably have a denier per filament of from 2.0 to 10.0, more preferably from about 2.0 dpf to about 9.0 dpf, still more preferably from about 2.0 dpf to about 8.0 dpf and most preferably from about 2.0 dpf to about 7.0 dpf. The post-compression extended fibers have a denier per filament that has been reduced by at least 1.0, thereby having a dpf (depending on the starting dpf) of about 1.0 up to about 9.0 dpf, more preferably from about 1.0 dpf up to about 8.0 dpf, still more preferably from about 1.0 dpf up to about 7.0 dpf, still more preferably from about 1.0 dpf up to about 6.0 dpf, still more preferably from about 1.0 dpf up to about 5.0 dpf and most preferably from more preferably from about 1.0 dpf up to about 4.0 dpf.

The polymeric binder material, which as noted above is commonly referred to in the art as a polymeric "matrix" material or "resin," is a material that binds fibers (and tapes, if present) together, either by way of its inherent adhesive characteristics or after being subjected to well-known heat and/or pressure conditions. As used herein, a "polymeric" binder or matrix material is preferably, but not necessarily, thermoplastic and includes resins and rubber. When present, the polymeric binder/matrix material either partially or substantially coats the individual fibers/tapes, preferably substantially coating each of the individual filaments/fibers/tapes forming the pre-pregs.

Suitable polymeric binder materials include both low tensile modulus, elastomeric materials and high tensile modulus, rigid materials. As used herein throughout, the term tensile modulus means the modulus of elasticity, which for polymeric binder materials is measured by ASTM D638. A low or high modulus binder may comprise a variety of polymeric and non-polymeric materials. For the purposes of this disclosure, a low modulus elastomeric material has a tensile modulus measured at about 6,000 psi (41.4 MPa) or less according to ASTM D638 testing procedures. A low modulus polymer is preferably an elastomer having a tensile modulus of about 4,000 psi (27.6 MPa) or less, more preferably about 2400 psi (16.5 MPa) or less, still more preferably 1200 psi (8.23 MPa) or less, and most preferably is about 500 psi (3.45 MPa) or less. The glass transition temperature ($T_g$) of the low modulus elastomeric material is preferably less than about 0° C., more preferably the less than about −40° C., and most preferably less than about −50° C. The low modulus elastomeric material also has a preferred elongation to break of at least about 50%, more preferably at least about 100% and most preferably at least about 300%. Whether a low modulus material or a high modulus material, the polymeric binder may also include fillers such as carbon black or silica, may be extended with oils, or may be vulcanized by sulfur, peroxide, metal oxide or radiation cure systems as is well known in the art.

A wide variety of materials and formulations may be utilized as a low modulus polymeric binder. Representative examples include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, polyamides (useful with some fiber types), acrylonitrile butadiene styrene, polycarbonates, and combinations thereof, as well as other low modulus polymers and copolymers curable below the melting point of the fiber. Also useful are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R-(BA)_x$ (x=3-150); wherein A is a block from a polyvinyl aromatic monomer and B is a block from a conjugated diene elastomer. Many of these polymers are produced commercially by Kraton Polymers of Houston, Tex. and described in the bulletin "Kraton Thermoplastic Rubber", SC-68-81. Also useful are resin dispersions of styrene-isoprene-styrene (SIS) block copolymer sold under the trademark PRINLIN® and commercially available from Henkel Technologies, based in Dusseldorf, Germany. Conventional low modulus polymeric binder polymers employed in ballistic resistant composites include polystyrene-polyisoprene-polystyrene block copolymers sold under the trademark KRATON® commercially produced by Kraton Polymers.

While low modulus polymeric binder materials are preferred for the formation of flexible impact resistant materials, high modulus polymeric binder materials are preferred for the formation of rigid impact resistant articles. High modulus, rigid materials generally have an initial tensile modulus greater than 6,000 psi. Useful high modulus, rigid polymeric binder materials include polyurethanes (both ether and ester based), epoxies, polyacrylates, phenolic/polyvinyl butyral (PVB) polymers, vinyl ester polymers, styrene-butadiene block copolymers, as well as mixtures of polymers such as vinyl ester and diallyl phthalate or phenol formaldehyde and polyvinyl butyral. A particularly useful rigid polymeric binder material is a thermosetting polymer that is soluble in carbon-carbon saturated solvents such as methyl ethyl ketone, and possessing a high tensile modulus when cured of at least about $1\times10^6$ psi (6895 MPa) as measured by ASTM D638. Particularly useful rigid polymeric binder materials are those described in U.S. Pat. No. 6,642,159, the disclosure of which is incorporated herein by reference.

Most specifically preferred herein are polar resins or polar polymers, particularly polyurethanes within the range of both soft and rigid materials at a tensile modulus ranging from about 2,000 psi (13.79 MPa) to about 8,000 psi (55.16 MPa). Preferred polyurethanes are applied as aqueous polyurethane dispersions that are most preferably, but not necessarily, cosolvent free. Such includes aqueous anionic polyurethane dispersions, aqueous cationic polyurethane dispersions and aqueous nonionic polyurethane dispersions. Particularly preferred are aqueous anionic polyurethane dispersions; aqueous aliphatic polyurethane dispersions, and most preferred are aqueous anionic, aliphatic polyurethane dispersions, all of which are preferably cosolvent free dispersions. Such includes aqueous anionic polyester-based polyurethane dispersions; aqueous aliphatic polyester-based polyurethane dispersions; and aqueous anionic, aliphatic polyester-based polyurethane dispersions, all of which are preferably cosolvent free dispersions. Such also includes aqueous anionic polyether polyurethane dispersions; aqueous aliphatic polyether-based polyurethane dispersions; and aqueous anionic, aliphatic polyether-based polyurethane dispersions, all of which are preferably cosolvent free dispersions. Similarly preferred are all corresponding variations (polyester-based; aliphatic polyester-based; polyether-based; aliphatic polyether-based, etc.) of aqueous cationic and aqueous nonionic dispersions. Most preferred is an aliphatic polyurethane dispersion having a modulus at 100% elongation of about 700 psi or more, with a particularly preferred range of 700 psi to about 3000 psi. More preferred are aliphatic polyurethane dispersions having a modulus at 100% elongation of about 1000 psi or more, and still more preferably about 1100 psi or more. Most preferred is an aliphatic, polyether-based anionic polyurethane dispersion having a modulus of 1000 psi or more, preferably 1100 psi or more.

The total weight of the binder forming a pre-preg/composite of this disclosure is preferably from about 2% to about 50% by weight, more preferably from about 5% to about 30%, more preferably from about 7% to about 20%, and most preferably from about 13% to about 16% by weight of the fibers plus the weight of the binder. The most preferred binder amount will vary depending on the requirements of the end use application. The quantity of binder will also depend on whether the component plies are formed from fibers or tapes. Lower amounts of binder are generally used when the plies are formed from tapes because the binder remains on the surface. Typically, when adhering two plies formed from tapes, the binder content is less than 10% by weight of the combined plies, most typically from about 4% to about 8% by weight of the combined plies, optionally with adjacent tapes being fused to each other and with no binder being present between tapes.

Methods of applying a polymeric binder material to fibers/tapes to form a binder impregnated pre-preg are well known and readily determined by one skilled in the art. The term "impregnated" is considered herein as being synonymous with "embedded," "coated," or otherwise applied with a polymeric coating where the binder material diffuses into the web/UDT ply and is not simply on a surface of the web/UDT ply. Any appropriate application method may be utilized to apply the polymeric binder material and the specific use of a term such as "coated" is not intended to limit the method by which it is applied onto the filaments/fibers/tapes. Useful methods include, for example, spraying, extruding or roll coating polymers or polymer solutions onto the fibers/tapes, as well as transporting the fibers/tapes through a molten polymer or polymer solution. Most preferred are methods that substantially coat or encapsulate each of the individual fibers/tapes and cover all or substantially all of the fiber/tape surface area with the polymeric binder material.

After the composite articles are fabricated by passage through the compression apparatus (e.g., compacting conveyor/press) or alternatively prior to passage of the one or more webs and/or one or more unidirectional tape plies through the compression apparatus, one more thermoplastic polymer films may be attached to the outermost surfaces of the web/plies of material (pre-press) or compacted composite (after-press). When attached to the webs/plies prior to compression, the films are simply placed upon the outer surfaces of the outermost web/plies and the films are merged with the web/plies when the combination is passed through the press, such as described in the Examples below. When attached after the web(s)/UDT ply/UDT plies are compressed in the press, the films may be laminated onto the compacted composite according to conventional thermal lamination conditions in the art. Typically, laminating is done by positioning the individual layers on one another under conditions of sufficient heat and pressure to cause the layers to combine into a unitary structure. Lamination may be conducted at temperatures ranging from about 95° C. to about 175° C., preferably from about 105° C. to about 175° C., at pressures ranging from about 5 psig (0.034 MPa) to about 100 psig (0.69 MPa), for from about 5 seconds to about 36 hours, preferably from about 30 seconds to about 24 hours. Such thermoplastic films may alternatively be bonded to the composite surfaces with hot glue or hot melt fibers as would be understood by one skilled in the art.

Suitable polymers for the thermoplastic polymer layer non-exclusively include polyolefins, polyamides, polyesters (particularly polyethylene terephthalate (PET) and PET copolymers), polyurethanes, vinyl polymers, ethylene vinyl alcohol copolymers, ethylene octane copolymers, acrylonitrile copolymers, acrylic polymers, vinyl polymers, polycarbonates, polystyrenes, fluoropolymers and the like, as well as co-polymers and mixtures thereof, including ethylene vinyl acetate (EVA) and ethylene acrylic acid. Also useful are natural and synthetic rubber polymers. Of these, polyolefin and polyamide layers are preferred. The preferred polyolefin is a polyethylene. Non-limiting examples of useful polyethylenes are low density polyethylene (LDPE), linear low density polyethylene (LLDPE), medium density polyethylene (MDPE), linear medium density polyethylene (LMDPE), linear very-low density polyethylene (VLDPE), linear ultra-low density polyethylene (ULDPE), high density polyethylene (HDPE) and co-polymers and mixtures thereof. Also useful are SPUNFAB® polyamide webs commercially available from Spunfab, Ltd, of Cuyahoga Falls, Ohio (trademark registered to Keuchel Associates, Inc.), as well as THERMOPLAST™ and HELIOPLAST™ webs, nets and films, commercially available from Protechnic S.A. of Cernay, France.

Any thermoplastic polymer layers are preferably very thin, having preferred layer thicknesses of from about 1 μm to about 250 μm, more preferably from about 5 μm to about 25 μm and most preferably from about 5 μm to about 9 μm. Discontinuous webs such as SPUNFAB® non-woven webs are preferably applied with a basis weight of 6 g/m². While such thicknesses are preferred, it is to be understood that other thicknesses may be produced to satisfy a particular need and yet fall within the scope of the present disclosure.

Finally, a particular advantage is achieved wherein the fibers/tapes forming the pre-preg web/UDT ply/multi-ply fabric are fibers/tapes having an initial elongation-to-break of 3.0% or greater, or more preferably an initial elongation-to-break of 4.0% or greater prior to being subjected to said axial extension stress, and from 2.0% to 3.9% after said axial extension stress. For example, UHMW PE fibers useful herein may be produced according to the method of U.S. Pat. No. 9,365,953 but wherein post-drawing of the fiber(s) is limited to maintain an elongation-to-break of greater than 4.0%, wherein drawing of these fibers in a post-drawing operation (i.e., the drawing operation after the spinning solvent has been removed/evaporated and the fiber dried, as specified in U.S. Pat. No. 9,365,953) is performed but terminated while the elongation-to-break of the fiber is greater than 4.0%. After termination of post-drawing, the fibers will be further axially extended in the compression apparatus described herein (e.g., double belt press), whereby the elongation-to-break percentage is further reduced by at least 1%. The final elongation-to-break percentage will depend on the beginning elongation-to-break percentage prior to being passed through the compression apparatus. Preferred fibers will have a final elongation-to-break of from 2.0% to 3.9%, preferably to from 2.9% to 3.9% due to being axially extended in the compression apparatus, wherein the elongation-to-break of each fiber is to be reduced by at least 1% due to passage through the compression apparatus under the conditions described above. Excellent minimization of yield loss problems associated with maximally drawing the fibers is to be achieved when post-drawing of the fibers (e.g., according to the methods described in U.S. Pat. No. 9,365,953 or any other method of forming high tenacity UHMW PE fibers) that form the pre-preg web/UDT ply/multi-ply fabric is terminated early such that their elongation-to-break remains above 4.0% upon entering the compression apparatus. Nevertheless, fibers/tapes having any elongation-to-break %, may be compressed and axially extended according to the process of the disclosure, wherein the elongation-to-break of each fiber is to be reduced by at least 1% irrespective of its elongation-to-break/elongation factor upon entry into the compression apparatus.

While the present technology has been particularly shown and described with reference to preferred embodiments, it will be readily appreciated by those of ordinary skill in the art that various changes and modifications may be made without departing from the spirit and scope of the disclosure. It is intended that the claims be interpreted to cover the disclosed embodiment, those alternatives which have been discussed above and all equivalents thereto. For example, rather than attaching two unidirectional squares/rectangles to each other by priming (such as by each being cut from a unidirectional fiber web and then stacked together coextensively, surface-to-surface, followed by priming) prior to passing them through the press, an alternate method may be used where a 2-ply web, such as a 2-ply 0°/90° web, is first formed by priming together two unidirectional webs such as illustrated in FIG. 4. In this embodiment, a first unidirectional pre-preg web of 0° axially oriented fibers (such as described in greater detail above, such as in a method illustrated in FIG. 1) is formed (Step 1), followed by converting that web of axially oriented fibers into web of fibers oriented at 90° (or any other desired angle, e.g., ±45°) by cutting the 0° web into sections, rotating the cut sections so that the fibers are oriented in the desired angle, and then taping the cut sections together to form a new web such as shown in FIG. 4 (Step 2). This new web, e.g., a 90° web as illustrated in FIG. 4, may then be adjoined with another 0° unidirectional pre-preg web (Step 3) such as by wet lamination, optionally together with intermediate and/or surface polymer films, and with the existing resin/binder coating on the fibers or an optional polymer film serving as an adhesive to aid in adhering the webs to each other. Thereafter, the 2-ply web or a plurality of said 2-ply webs (e.g., a plurality of 2-ply, 0°/90° webs adjoined coextensively, surface-to-surface), are passed through the compression apparatus, such as those described above (step not illustrated in FIG. 4). The following non-limiting Examples serve to illustrate the preferred embodiments of this disclosure.

Comparative Examples 1-13

A continuous, four-ply composite web was fabricated from SPECTRA® ultra-high molecular weight polyethylene filament bundles/fibers (1332 denier unidirectional filament bundles; 5.5 denier per filament (dpf); tenacity of about 36.6 grams per denier (g/d)) from Honeywell International Inc. In each web ply, the fibers were coated with a PRINLIN® B7137HV binder (commercially available from Henkel Technologies, based in Dusseldorf, Germany), which is a water based dispersion of a styrene-isoprene-styrene resin block copolymer (KRATON® D1107), with the combined structure containing 15 weight percent of the PRINLIN® B7137HV binder (based on the total weight of the 2-ply web).

Figure 2:
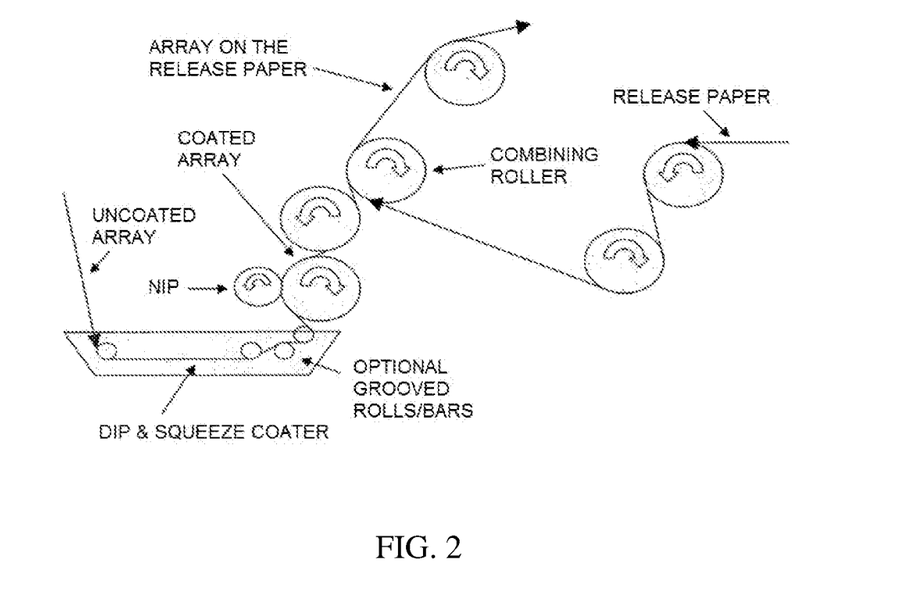
FIG. 2 is a schematic perspective view of a unidirectional fiber array being coated with a binder resin by passage through a dip coater followed by joining the coated array with a release film.

To form the multi-ply composite web, a first 64 inch (162.5 cm) wide continuous, non-woven unidirectional (axial) web of unidirectional filament bundles was formed from a parallel array of fibers/filament bundles including 380 of the 1332 denier fibers/filament bundles. The array was formed from a process such as illustrated in FIG. 1 wherein each bundle is unwound from a spool that is mounted on a creel followed by arranging the bundles into the parallel array by passing them through a collimating comb/heddle. The parallel array of bundles was then passed through an aqueous adhesive bath such as illustrated in FIG. 2 of the PRINLIN® B7137HV dispersion to coat the filament bundles (and typically each of the individual filaments forming the bundles) with the adhesive. The array of coated filament bundles was then passed through spreader bars, also such as illustrated in FIG. 2, to achieve some partial filament spreading. The coated, partially spread filaments were then passed through a nip to remove some excess binder composition coating, and then the coated array of fibers was applied onto one side of silicone release paper (shown as optional in FIG. 2) and dried (e.g., by heating the web to about 100° C. to evaporate the water from the aqueous binder composition). This dry web was then cut up into a plurality of 64-inch×64-inch squares. These squares were then turned so that the component filaments were oriented at 90° relative to the original axial filament orientation when the web was fabricated (such as illustrated in FIG. 4) and a plurality of these squares were then laid next to each other side-by-side in coplanar fashion and taped together with no spacing between the laid plies, thereby forming a continuous transverse web (a continuous web of filaments oriented at 90°).

A second 64-inch wide continuous, non-woven unidirectional (axial) web was then fabricated in the same way as the first web, with the same 1332 denier, 36.6 g/d UHMW PE filament bundles/fibers being formed into another array and then coated with the same aqueous PRINLIN® B7137HV dispersion according to a coating method such as illustrated in FIG. 2. This web was not cut up but remained as an axial web with its component filaments being oriented in the same longitudinal direction as the filament bundles were when originally provided from the creel and passed through the collimating comb, i.e., the 0° direction. At this point, rather than combining the coated axial array with a silicone release paper such as shown in FIG. 2 it was combined with the already fabricated transverse web, with the two webs being combined while the binder composition coating on the 0° axial web was still wet. During this process (priming by wet lamination), a pressure of about 1 psi was applied to the webs as they passed through the combining rollers and heat was applied to the combined webs to evaporate the water of the aqueous binder (heated to a temperature of about 100° C.) and thereby form a dry 2-ply web with the filament directions of the plies being orthogonally oriented at 0°/90°.

A second 2-ply web, fabricated exactly as described immediately above was then formed. The two 2-ply webs were then adjoined coextensively (one on top of the other with their full surfaces completely covering each other) maintaining a 0°/90°/0°/90° orientation of the filamentous webs as adjoined. Thereafter, the two 2-ply webs were loosely adjoined with continuous films/sheets of linear low density polyethylene (LLDPE), one on each outer surface of the combined webs (each film having a thickness of approximately 0.35 mil (8.9 µm)).

The stack of two continuous 2-ply webs together with the two outer LLDPE films on the webs were then transferred to a flat-bed laminator wherein they were consolidated under heat and pressure by wet lamination to create a 4-ply composite web. The lamination temperature was 110° C. with a continuous pressure of approximately 200 pounds per square inch applied to the adjoined webs. The resulting structure was a unitary, monolithic, 4-fibrous ply composite web including (Film/0° Web/90° Web/0° Web/90° Web/Film). A plurality of square/rectangular test samples were then cut from this 4-ply composite web and tested for their tensile, shear and friction properties.

Comparative Examples 1-5

Tensile Property Testing

The tension properties were obtained by following the guidelines of ASTM D3019 and ASTM D5034/5035 on a standard Instron 1332 load frame machine using MTS 647.10A hydraulic grips. The test samples were directly attached to the grips and tension was applied by pulling the sample apart with the grips until failure. All tests were conducted at room temperature (72° F.) at a tensile loading rate of 0.1 in/min. Displacement and strain data was obtained using DIC (digital image correlation) equipment to obtain digital image which was then analyzed using VIC3D software from Correlated System Inc. The tension specimens were tested until failure.

TABLE 1

| Sample ID | Young's modulus (GPa) | Tensile Strength (GPa) | Elongation at failure (%) |
| --- | --- | --- | --- |
| 1 | 25.04 | 0.718 | 3.9 |
| 2 | 23.64 | 0.670 | 3.0 |
| 3 | 26.60 | 0.683 | 2.9 |
| 4 | 25.35 | 0.689 | 2.8 |
| 5 | 29.47 | 0.784 | 2.8 |
| Average | 26.02 | 0.709 | 3.08 |

Comparative Examples 6-9

Shear Property Testing

The shear properties were obtained using the testing method of ASTM D8067. Rather than directly attaching the test samples to hydraulic grips as in Comparative Examples 1-5, the test samples were mounted on a rectangular picture frame type fixture held in a standard Instron 1332 load frame machine. The rectangular frame was then gripped by with the same MTS 647.10A hydraulic grips as in Comparative Examples 1-5. The shear properties of the material are tested under a quasi-static, extremely small loading (shear strain) with the load being applied at two diagonal corners as per the ASTM D8067 method. The shear strain rate of the test was 0.1 in/min and the specimens were loaded until they buckled. The displacement and strain data was obtained using DIC equipment and analyzed using VIC3D software from Correlated System Inc. as described above for Comparative Examples 1-5.

TABLE 2

| Sample ID | Max. Shear (kg/inch$^2$)(ksi) |
| --- | --- |
| 6 | 0.382 |
| 7 | 0.43 |
| 8 | 0.494 |
| 9 | 0.480 |
| Average | 0.430 |

Comparative Examples 10-13

Coefficient of Friction Testing

The samples were also tested to determine their coefficient of friction, with the friction properties being measured according to the ASTM G115 method. The friction tests were carried out on a GCTS bi-axial test frame (manufactured by International Test Equipment manufactured in Tempe, Ariz.) with a shear actuator moving the sample and with a normal actuator applying a normal force on the sample at a constant displacement. Friction data was obtained from the system using two load cells: a vertical normal actuator and a shear actuator.

TABLE 3

| Sample ID | Friction co-efficient Axial | Friction co-efficient Cross-direction |
|---|---|---|
| 10 | 0.231 | 0.179 |
| 11 | 0.255 | 0.187 |
| 12 | 0.209 | 0.267 |
| 13 | 0.180 | 0.218 |
| Average | 0.219 | 0.218 |

Examples 14-26

A new continuous 4-fibrous ply composite web (Film/0° Web/90° Web/0° Web/90° Web/Film) was fabricated from the same materials (same fiber, binder and film types) with two 2-ply 0°/90° continuous webs being fabricated in exactly the same way as described for Comparative Examples 1-13 above, but rather than consolidating the two 2-ply continuous webs and LLDPE films together at high pressure in a flat-bed laminator the two 2-ply webs and films were consolidated in an isobaric steel belt press (double steel belt press) such as illustrated in FIG. 3. In this regard, the two 2-ply fibrous webs and the two outer LLDPE films were adjoined and then fed together all at once into the isobaric steel belt press with the combination being passed through the press at a rate of 4-meters per minute. The press had a heating zone that was set to 110° C. and was set to apply a pressure of 80-bar (1160-psi) to the stacked webs and films passing through the press heated zone, thereby subjecting them to an axial extension stress while it is concurrently heated. After passing through the heated zone, the material (i.e., the combined webs and films) was then cooled to less than 50° C. in a cooling zone of the press that was set to a temperature of about 40° C., while still maintaining the same 80 bar pressure on the material as in the heating zone, thereby continuing to subject the material to an axial extension stress so that it is maintained under a continuous and constant pressure, thereby continuously compressing/compacting the material. After the 4-ply material passed through the full length of the press it was cooled down to room temperature (approximately 72° C.) while still being held under the same pressure. Once at or approximately at room temperature, the compacted material was then removed from the press apparatus. The resulting structure was a unitary, monolithic, 4-fibrous ply composite web including (Film/0° Web/90° Web/0° Web/90° Web/Film). A plurality of square/rectangular test samples were then cut from this 4-ply composite web and tested for their tensile, shear and friction properties.

Examples 14-18

Tensile Property Testing

The tension properties were obtained by following the guidelines of ASTM D3019 and ASTM D5034/5035 on a standard Instron 1332 load frame machine using MTS 647.10A hydraulic grips. The test samples were directly attached to the grips and tension was applied by pulling the sample apart with the grips until failure. All tests were conducted at room temperature (72° F.) at a tensile loading rate of 0.1 in/min. Displacement and strain data was obtained using DIC (digital image correlation) equipment to obtain digital image which was then analyzed using VIC3D software from Correlated System Inc. The tension specimens were tested until failure.

TABLE 4

| Sample ID | Young's modulus (GPa) | Tensile Strength (GPa) | Elongation at failure (%) |
|---|---|---|---|
| 14 | 28.56 | 0.755 | 3.0 |
| 15 | 28.78 | 0.854 | 3.8 |
| 16 | 29.42 | 0.878 | 3.7 |
| 17 | 31.80 | 0.734 | 2.6 |
| 18 | 30.39 | 0.867 | 3.3 |
| Average | 29.78 | 0.818 | 3.3 |

Examples 19-22

Shear Property Testing

The shear properties were obtained using the testing method of ASTM D8067. Rather than directly attaching the test samples to hydraulic grips as in Comparative Examples 1-5, the test samples were mounted on a rectangular picture frame type fixture held in a standard Instron 1332 load frame machine. The rectangular frame was then gripped by with the same MTS 647.10A hydraulic grips as in Comparative Examples 1-5. The shear properties of the material are tested under a quasi-static, extremely small loading (shear strain) with the load being applied at two diagonal corners as per the ASTM D8067 method. The shear strain rate of the test was 0.1 in/min and the specimens were loaded until they buckled. The displacement and strain data was obtained using DIC equipment and analyzed using VIC3D software from Correlated System Inc. as described above for Comparative Examples 1-5.

TABLE 5

| Sample ID | Max. Shear (ksi) |
|---|---|
| 19 | 0.694 |
| 20 | 0.664 |
| 21 | 0.750 |
| 22 | 0.816 |
| Average | 0.731 |

Examples 23-26

Coefficient of Friction Testing

The samples were also tested to determine their coefficient of friction, with the friction properties being measured according to the ASTM G115 method. The friction tests were carried out on a GCTS bi-axial test frame (manufactured by International Test Equipment manufactured in Tempe, Ariz.) with a shear actuator moving the sample and with a normal actuator applying a normal force on the sample at a constant displacement. Friction data was obtained from the system using two load cells: a vertical normal actuator and a shear actuator.

TABLE 6

| Sample ID | Friction co-efficient Axial | Friction co-efficient Cross-direction |
|---|---|---|
| 23 | 0.072 | 0.149 |
| 24 | 0.097 | 0.175 |
| 25 | 0.168 | 0.195 |
| 26 | 0.186 | 0.197 |
| Average | 0.131 | 0.179 |

CONCLUSIONS

The fibers in each fiber ply were axially extended as a result of the axial extension stress applied to the fibers in the press. The tenacity of each fiber in each ply was increased by at least 1% and the elongation-to-break of each fiber was reduced by at least 1%, with said reduced elongation-to-break value being from about 2.0% to about 3.9%.

Additionally, the new material of this disclosure exhibited higher tensile properties, lower elongation, greater shear strength and a lower coefficient of friction relative to the comparative materials that were not processed through the press.

What is claimed is:

1. A method for enhancing fiber tensile properties of a fibrous pre-preg composite, the method comprising:
   a) providing at least one fibrous pre-preg composite, each fibrous pre-preg composite comprising at least two unidirectional fiber plies, each of said plies comprising a plurality of unidirectionally oriented fibers coated with a polymeric binder, wherein said fibers have a softening temperature and a melting temperature; and wherein said each of said at least one fibrous pre-preg composites has been primed by pressing under a pressure of less than 5 psi;
   b) heating the fibers of said composite to a temperature above the softening temperature of the fibers but below the melting temperature of the fibers; and then
   c) subjecting the composite to an axial extension stress by passing the composite through an isobaric double belt press while said fibers are at said temperature above the softening temperature of the fibers but below the melting temperature of the fibers.

2. The method of claim 1 wherein the isobaric double belt press comprises two pressure exerting elements, wherein the composite is compressed between said pressure exerting elements whereby said pressure exerting elements concurrently subject the composite to an axial extension stress while the composite is simultaneously conveyed through said isobaric double belt press.

3. The method of claim 2 wherein the magnitude of said axial extension stress is at least about 0.25 kilogram-force (2.45 Newtons).

4. The method of claim 1 wherein the fibers are ultra-high molecular weight polyethylene fibers having a tenacity of from 33 g/denier to about 60 g/denier and a denier per filament of from 1.0 dpf up to about 7.0 dpf.

5. The method of claim 1 wherein said polymeric binder is thermoplastic and wherein said polymeric binder is dried and/or cured prior to passing said composite through said isobaric double belt press.

6. The method of claim 2 wherein each composite comprises two cross-plied unidirectional fiber plies that have been consolidated together, wherein the composite is subjected to a multi-axial extension stress while being passed through said isobaric double belt press.

7. The method of claim 6 wherein a plurality of said composites are inserted into said isobaric double belt press, wherein said composites are unattached to each other upon insertion into said isobaric double belt press.

8. The method of claim 7 wherein each composite comprises two adjoined plies wherein the fibers of the two adjoined plies are cross-plied at 0°/90° relative to each other, and wherein the isobaric double belt press comprises two pressure exerting elements, wherein the composites are compressed together between said pressure exerting elements whereby said pressure exerting elements concurrently subject the composite to an axial extension stress and a transverse axial extension stress as the composite is simultaneously conveyed through said isobaric double belt press.

9. The method of claim 8 wherein the magnitude of the axial extension stress applied to each ply is equivalent.

10. The method of claim 8 wherein prior to insertion into the isobaric double belt press the plurality of composites are not adhered to each other.

11. The method of claim 4 wherein each of said fibers comprise a plurality of filaments, said fibers having a denier of at least 400 and said filaments having a denier per filament of from 0.5 to 10.0.

12. The method of claim 1 further comprising forming said composite into a ballistic resistant article after step c).

13. A method for enhancing fiber tensile properties of a fibrous pre-preg composite, the method comprising:
   a) providing at least two unidirectional fiber plies, each of said plies comprising a plurality of unidirectionally oriented fibers coated with a polymeric binder, wherein said fibers have a softening temperature and a melting temperature;
   b) adjoining the unidirectional fiber plies wherein they are stacked together coextensively, surface-to-surface;
   c) priming the adjoined unidirectional fiber plies by pressing them together under a pressure of less than 5 psi, wherein said adjoined unidirectional fiber plies are adhered to each other and thereby form a pre-preg composite;
   d) heating the fibers of said pre-preg composite to a temperature above the softening temperature of the fibers of each unidirectional fiber ply but below the melting temperature of said fibers of each unidirectional fiber ply; and
   e) compressing the composite in an isobaric double belt press, wherein the composite is subjected to an axial extension stress while said fibers of each unidirectional fiber ply are at said temperature above the softening temperature of said fibers of each unidirectional fiber ply but below the melting temperature of said fibers of each unidirectional fiber ply, whereby the fibers in each unidirectional fiber ply are axially extended by said axial extension stress.

14. The method of claim 13 wherein the adjoined unidirectional fiber plies are primed by pressing them together under a pressure of from about 0.01 psi (68.9 Pa) to 2.0 psi (0.0138 MPa).

15. The method of claim 13 wherein the fibers are ultra-high molecular weight polyethylene fibers having a tenacity of from 33 g/denier to about 60 g/denier and a denier per filament of from 1.0 dpf up to about 7.0 dpf.

16. The method of claim 1 wherein the fibers in each fiber ply are axially extended by said axial extension stress whereby the tenacity of each fiber in each ply is increased by at least 1% and the elongation-to-break of each fiber is reduced by at least 1%, wherein elongation-to-break is determined by ASTM D2256.

17. The method of claim 1 wherein said fibers have a tenacity of 7 g/denier or more, a tensile modulus of 150 g/denier or more and an elongation-to-break of at least 2.0%.

18. The method of claim 2 wherein the composite is passed through the isobaric double belt press as a continuous web, wherein the web is maintained under continuous and constant axial tension, and wherein the tension is from about 5 Newtons/cm to about 50 Newtons/cm while said web is within the isobaric double belt press.

19. The method of claim 13 wherein in step e) the composite is compressed with an applied pressure of from about 45 bar (about 600 psi) to about 80 bar (1100 psi).

20. The method of claim 13 wherein said fibers have a tenacity of 7 g/denier or more, a tensile modulus of 150 g/denier or more and an elongation-to-break of at least 2.0%.

* * * * *